US007862738B2

(12) United States Patent
Ueda et al.

(10) Patent No.: US 7,862,738 B2
(45) Date of Patent: Jan. 4, 2011

(54) LUMINOUS BODY

(75) Inventors: Tadashi Ueda, Fukui (JP); Seikoh Yamauchi, Ohta-ku (JP); Jiro Kanamori, Ikoma (JP); Yoshisada Hayashi, Suita (JP)

(73) Assignee: Kuraray Co., Ltd., Kurashiki-shi (JP)

( * ) Notice: Subject to any disclaimer, the term of this patent is extended or adjusted under 35 U.S.C. 154(b) by 699 days.

(21) Appl. No.: 11/662,545

(22) PCT Filed: Oct. 10, 2006

(86) PCT No.: PCT/JP2006/320520

§ 371 (c)(1),
(2), (4) Date: Mar. 12, 2007

(87) PCT Pub. No.: WO2007/043676

PCT Pub. Date: Apr. 19, 2007

(65) Prior Publication Data
US 2009/0051282 A1 Feb. 26, 2009

Related U.S. Application Data

(63) Continuation-in-part of application No. 11/246,205, filed on Oct. 11, 2005, now abandoned, and a continuation-in-part of application No. 11/246,204, filed on Oct. 11, 2005, now abandoned, and a continuation-in-part of application No. 11/246,200, filed on Oct. 11, 2005.

(51) Int. Cl.
C09K 11/87 (2006.01)

(52) U.S. Cl. ............... 252/62.3 GA; 252/62.3 ZT; 252/62.3 ZB; 252/62.3 V; 252/62.3 BT

(58) Field of Classification Search ......... 252/62.3 GA, 252/62.3 ZT, 62.3 ZB, 62.3 V, 62.3 BT; 75/230, 75/252, 253, 245
See application file for complete search history.

(56) References Cited

U.S. PATENT DOCUMENTS

| | | | |
|---|---|---|---|
| 6,297,190 B1 * | 10/2001 | Park et al. | 502/327 |
| 6,562,292 B2 | 5/2003 | Ito et al. | |
| 6,602,731 B2 | 8/2003 | Andriessen | |
| 6,645,393 B2 * | 11/2003 | Lee | 252/62.3 R |
| 6,828,728 B2 | 12/2004 | Ishii et al. | |
| 2003/0080676 A1 | 5/2003 | Vaddi et al. | |
| 2005/0023546 A1 * | 2/2005 | Menkara et al. | 257/98 |
| 2005/0189518 A1 * | 9/2005 | Arakawa | 252/301.6 S |
| 2007/0013300 A1 | 1/2007 | Takahashi et al. | |
| 2007/0080327 A1 | 4/2007 | Ueda et al. | |
| 2007/0080631 A1 | 4/2007 | Ueda et al. | |

FOREIGN PATENT DOCUMENTS

| | | |
|---|---|---|
| JP | 63-243205 | 10/1988 |
| JP | 05-074572 | 3/1993 |
| JP | 05-211093 | 8/1993 |
| JP | 08-183954 | 7/1996 |
| JP | 2003-073119 | 3/2003 |
| JP | 2003-173878 | 6/2003 |
| JP | 2006 143947 | 6/2006 |
| RU | 2014669 C1 | 6/1994 |
| RU | 2091340 C1 | 9/1997 |
| WO | 93/12934 | 7/1993 |
| WO | 2004 112437 | 12/2004 |
| WO | 2004/112437 A1 | 12/2004 |

OTHER PUBLICATIONS

Spoonhower et al, "Raiative Recombintaion At Ir+3 Sites In Doped AgBr", Radiation Effects, vol. 72, 1983, pp. 25-29.*
Spoonhower, John P. et al.,"Radiative Recombination at $Ir^{3+}$ Sites in Doped AgBr", Radiation Effects. vol. 73, pp. 25-29, 1983.
Kina, Hideki et al. "ZnS:Mn thin-film electroluminescent devices prepared by metalorganic chemical vapor deposition", Journal of Crystal Growth 169 (1996) pp. 33-39.
Toyama, T. et al. "Novel green thin-film electroluminescent devices utilizing ZnS nanocrystals doped with Tb compounds", Applied Surface Science 244 (2005), pp. 524-527.
Bol, Ageeth A. et al. "Luminescence of nanocrystalline $ZnS:Cu^{2+}$", Journal of Luminescence 99 (2002) pp. 325-334.
Kim, J.P. et al. "Improved brightness and efficiency in Ce codoped ZnS:TbOF electroluminescent thin films", Journal of Applied Physics, vol. 93, No. 12, Jun. 15, 2003, pp. 9597-9603.
Waldrip, Karen E. et al. Improved brightness, efficiency, and stability of sputter deposited alternating current thin film electroluminescent ZnS:Mn by codoping with potassium chloride, Applied Physics Letters, vol. 76, No. 10, Mar. 6, 2000, pp. 1276-1278.
Xian, Hong et al. "Excitation and Radiative Efficiencies in ZnS:Mn Thin Film Electroluminescent Devices Prepared by Reactive Radio-Frequency Magnetron Sputtering", Japanese Journal of Applied Physics, Part 1: Regular Papers and Short Notes & Review Papers. vol. 33, No. 10, Oct. 1994, pp. 5801-5806.
Office Action Issued: Aug. 12, 2010, Application No. 2008118345/15(021180) with English language translation.
Im Thek-de et al., "Shock-wave synthesis of chromium-doped superdispersed Al203", Letters to JTP, 2001, vol. 27, No. 13, pp. 10-15 (partial English translation).
L. Ya. Markovsky et al., "Luminophors", Moscow-Leningrad, Chemistry, 1996, pp. 10,11,91 (partial English translation).
Ed by A. Yu. Ishlinsky, "The Great Encyclopedic Dictionary Polytechnic", Great Russian Encyclopedia, Scientific Publisher, Moscow, 2000, p. 405.

* cited by examiner

Primary Examiner—C. Melissa Koslow
(74) Attorney, Agent, or Firm—Oblon, Spivak, McClelland, Maier & Neustadt, L.L.P.

(57) ABSTRACT

The present invention relates to an inorganic composition mainly containing a compound semiconductor, wherein the inorganic composition contains iridium element. The invention also relates to a method of producing an inorganic composite for producing an luminescent material, wherein the method comprises subjecting an inorganic composition mainly containing a compound semiconductor to an explosion by gunpowder and/or explosive in a sealed vessel.

An inorganic composite for producing a luminescent material can be prepared by subjecting an inorganic composition to a doping treatment such as explosive treatment or heat-treatment. The inorganic composite can further be heat-treated to produce a luminescent material. The resulting luminescent material can be formed into a layer as a light emitter layer of an inorganic EL device.

4 Claims, 3 Drawing Sheets

LUMINOUS BODY

TECHNICAL FIELD

The present invention relates to a luminous body, more concretely an inorganic composite for producing a luminescent material and a method of producing the composite, and a luminescent material. More specifically, the invention relates to a method of producing an inorganic composite, comprising subjecting an inorganic composition to an explosion by gunpowder and/or explosive in a sealed vessel, a method of producing an inorganic composite for producing a luminescent material, wherein the inorganic composition containing iridium element is used, and a luminescent material obtained by heat-treating the inorganic composite. Since the luminescent material of the present invention has excellent emission efficiency, it can be preferably used for electroluminescence device (EL device).

The present invention also relates to an inorganic composition. More specifically, the invention relates to an inorganic composition containing a compound semiconductor as a main component, wherein the inorganic composition contains iridium element. The inorganic composition of the present invention can be preferably used as a raw material for a luminescent material for producing an inorganic EL device, which exhibits high efficiency of photoconversion of electric energy or photoenergy.

Further, the present invention relates to an inorganic EL device capable of emitting by direct current.

BACKGROUND ART

An electroluminescence device is a light-emitting device using a luminescent phenomenon occurring while an electric field is applied to a substance, and can be roughly classified into an organic EL device based on an organic material including metal complexes such as alumiquinolinol or conjugated macromolecules such as polyphenylenevinylene, and an inorganic EL device based on an inorganic material such as zinc sulfide or aluminum oxide salts.

Since the inorganic EL device has excellent durability and low power consumption as compared to the organic EL device, it is expected that the inorganic EL device will be applied to an image displaying system such as a light and large flat panel display. Further, the inorganic EL device can be classified into a dispersion type EL device obtained by dispersing a luminescent material in an inorganic or organic binder, and a thin film type EL device using a thin crystal film of a luminescent material. Although each type of the devices can act as a light emitting device by applying direct current or alternating current, in general, the thin film type EL device is superior as a high brightness and low power consumption device.

Here, in order to prepare an image displaying system, luminescent materials exhibiting emission such as red, green, blue, or the like are necessary. In the prior art, it has been known that, since an inorganic EL device is fabricated based on a Group II-VI compound composed of Group II element and Group VI element, such as ZnS or SrS, a material obtained by adding a small amount of Mn (manganese) to ZnS emits yellow-orange light (For example, see non-patent document 1.);

a material obtained by adding Tb (terbium) and the like to ZnS emits green light (For example, see non-patent document 2.); and a material obtained by adding Cu (copper) and the like to ZnS emits blue light (For example, see non-patent document 3.).

In general, these materials can be obtained by a process for doping a small amount of metals into a base carrier, such as firing (For example, see patent document 1.), or further, by doping at the time of preparing particles in a liquid phase and the like (For example, see patent document 2.).

An inorganic EL device can be prepared by forming an electrode on each of opposing sides of EL materials, and it can exhibit a luminescent phenomenon inherent in the inorganic EL material used, when a predetermined voltage is applied between the two electrodes of the inorganic EL device.

However, from the above inorganic EL materials, it is difficult to obtain a light emitter having a color and an emission intensity available to an image displaying system.

Luminescent bodies having obtained so far have problems that they do not have sufficient luminance and that they have shorter lifetime than other illumination (patent document 3). Luminance may be increased by applying a higher voltage. However, lifetime of a light emitter tends to become short, depending on an increase of an applied voltage. Consequently, it is necessary to select either brightness or lifetime.

[non-patent document 1] Journal of Crystal Growth 169 (1996) p 33-39

[non-patent document 2] Applied Surface Science 244 (2005) p 524-527

[non-patent document 3] Journal of luminescence 99 (2002) p 325-334

[patent document 1] Japanese patent publication Kokai Hei08-183954

[patent document 2] Japanese patent publication Kokai 2003-73119

[patent document 3] Japanese patent publication Kokai 2002-241753

DISCLOSURE OF THE INVENTION

Problems to be Solved by the Invention

The purpose of the present invention is to provide a novel method of producing a luminescent material having a combination of high levels of luminance and lifetime of a light emitter, and a novel inorganic composite which may be used for the method, and a novel luminescent material.

The other purpose of the present invention is to provide an inorganic composition which may be used as a raw material for producing a luminescent material capable of emitting with high efficiency by its novel composition of materials.

The other purpose of the present invention is to provide an inorganic EL device capable of being driven by direct current, whereby it is useful for light sources for mobile applications and high brightness applications such as illumination.

Means for Solving the Problems

The present invention provides as follows.

[1] A method of producing an inorganic composite for producing a luminescent material, wherein the method comprises subjecting an inorganic composition mainly containing a compound semiconductor to an explosion by gunpowder and/or explosive in a sealed vessel.

[2] The method of producing an inorganic composite of [1], wherein the inorganic composition contains iridium element.

[3] An inorganic composition containing a compound semiconductor as a main component and iridium element.

[4] The inorganic composition of [3], containing a transition metal, a halogen, or a rare earth element.

[5] The inorganic composition of [3] or [4], wherein the compound semiconductor is a Group II-VI compound semiconductor.

[6] An inorganic composite for producing a luminescent material, which is obtained from an inorganic composition of any one of [3] to [5].

[7] A method of producing an inorganic composite, wherein the method comprises heat-treating an inorganic composition of any one of [3] to [5].

[8] A method of producing a luminescent material, wherein the method comprises heat-treating an inorganic composite obtained by the method of [1] or [7].

[9] A luminescent material obtained by the method of [8].

[10] An inorganic EL device using the luminescent-material of [9].

[11] An inorganic EL device comprising:
at least two electrodes; and
a light emitter layer composed of a luminescent material of [9], and provided between the electrodes;
wherein the brightness of the device attained during direct current driving is 10,000 cd/m$^2$ or more.

[12] The inorganic EL device of [11], wherein the thickness of the light emitter layer is from 0.05 μm to 100 μm.

[13] The inorganic EL device of [11] or [12], wherein the light emitter layer comprises plural light emitting layers having different compositions from each other.

ADVANTAGE OF THE INVENTION

The present invention can provide a method of producing an inorganic composite. The luminescent material obtained by heat-treating an inorganic composite obtained by the producing method of the present invention has improved luminance as well as improved lifetime of a luminescent body, and therefore, can be used suitably for an inorganic EL device.

The present invention can also provide an inorganic composition containing iridium element. The inorganic EL device prepared using the inorganic composition of the present invention as a raw material for producing a luminescent material can emit with high efficiency by its composition of materials. Thus, the inorganic composition of the present invention can be used as a luminescent material to obtain an excellent luminous body without processes such as pulverizing that cause new problems such as agglomeration.

The present invention can also provide an inorganic EL device capable of being driven by direct current, and being useful for mobile applications. Since the device has high brightness, it can provide light sources useful for various applications.

BEST MODE FOR CARRYING OUT THE INVENTION

Figure 1:
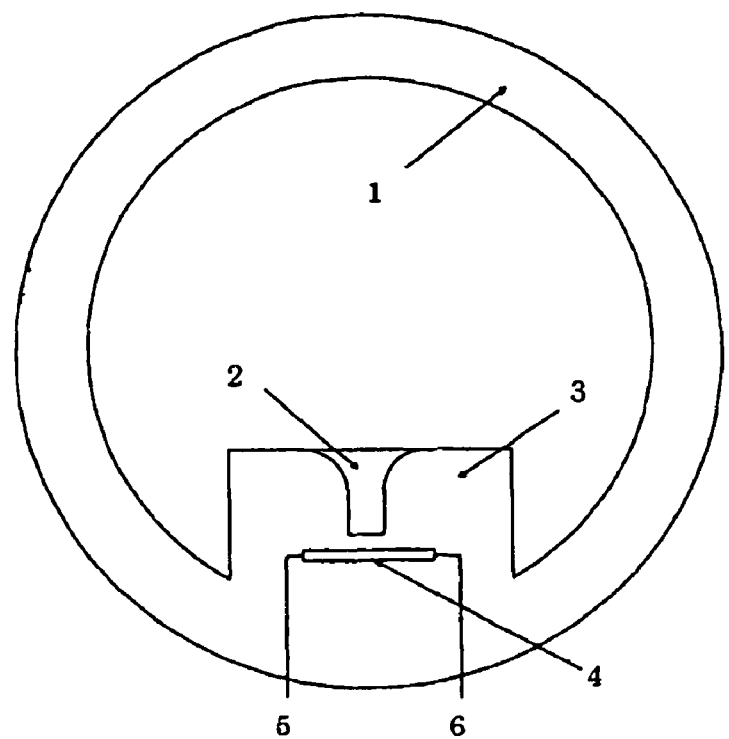
FIG. 1 is a schematic view of a high pressure-resistant vessel.

The inorganic composition of the present invention may be used as a raw material for producing a luminescent material. An inorganic composite for producing a luminescent material may be prepared by subjecting the inorganic composition to a doping treatment such as explosive treatment and heat-treatment. Further, a luminescent material may be prepared by heat-treating the inorganic composite. The resulting luminescent material may be formed into a layer as a light emitter layer in an inorganic EL device.

(Inorganic Composition)

Inorganic compositions containing a compound semiconductor as a main component have been used in various fields including luminescent materials such as fluorescent and phosphorescent materials, and light storing materials. Some compositions have the function of emitting light upon receipt of electric energy, and are mainly used as a light source, and some of such compositions are used in display and other applications.

However, currently known materials can only be used in limited applications because they have problems such as heat emission or power consumption due to their insufficient photoconversion efficiency of electric energy. Attempts have been made so far to improve the energy conversion efficiency, and the following examples of the attempts are known:

(1) a process of pulverizing a material into ultra-fine particles (patent document 4);
(2) a process of selecting a doping material such as cerium (non-patent document 4);
(3) a process of further co-doping a chloride or the like (non-patent document 5); and
(4) modifying a process to fabricate a device (non-patent document 6).

[patent document 4] Japanese patent publication Kokai 2003-173878

[non-patent document 4] Journal of Applied Physics, vol. 93, 12, Jun. 15, 2003, p 9597-9603

[non-patent document 5] Applied Physics Letters, vol. 76, 10, Mar., 2000, p 1276

[non-patent document 6] Japanese Journal of Applied Physics, Part 1: Regular Papers & Short Notes & Review Papers, vol. 33, 10, Oct., 1994, p 5801-5806

(1) According to patent document 4, the process of pulverizing the material disclosed in the patent document into ultra-fine particles may be conducted without any limitation. However, when the material is mechanically pulverized into ultra-fine particles, there is a problem of a contamination by impurities from the machine used during pulverization of the material. Further, ultra-fine particles generally agglomerate during their storage. Such agglomeration provides the same behavior as that in the case where large particles are used. There is a problem of a secondary agglomeration, and for the purpose to solve the problem, it is necessary to use a dispersing agent which results in a low efficiency.

(2) Regarding the doping and co-doping materials disclosed in non-patent documents 4 and 5, no composition providing sufficiently high efficiency has been found so far.

(3) To modify a process of a device to such a special process using a magnetron as disclosed in non-patent document 6 provides uneconomic results such as a complicated device fabrication, a long distance process, an expensive system, an increase in the total energy amount.

Thus, there is a demand for an inorganic composition which may be used as a raw material for a luminescent material capable of emitting a light efficiently due to a novel formulation of the inorganic composition. The inorganic composition of the present invention solves the above problems in the prior art.

If the inorganic composition contains a transition metal such as iridium, manganese, copper, silver, gold, and hafnium, and a rare earth element such as cerium, praseodymium, neodymium, samarium, europium, gadolinium, terbium, dysprosium, holmium, erbium, thulium, ytterbium, lutetium and yttrium, the transition metal etc. can be taken into a compound semiconductor in the inorganic composition by a doping treatment described below, and can act as an emission center. In particular, the inorganic composition of the present invention is characterized in that it contains iridium element as the transition metal.

Compound Semiconductor:

The compound semiconductor used in the present invention includes a substance having a conductivity at room temperature of about $10^3$ to about $10^{-10}$ S/cm, which is between the conductivity of metals and the conductivity of insulating materials. Concrete examples of the compound semiconductor include:

Group IV elements such as silicon or germanium;

Group II-VI compound semiconductors composed of Group II and Group VI compounds;

Group III-V compound semiconductors composed of Group III and Group V compounds;

Group I-V compound semiconductors composed of Group I and Group V compounds;

Group I-VI compound semiconductors composed of Group I and Group VI compounds;

Group I-VII compound semiconductors composed of Group I and Group VII compounds;

Group II-IV compound semiconductors composed of Group II and Group IV compounds;

Group II-V compound semiconductors composed of Group II and Group V compounds;

Group II-VII compound semiconductors composed of Group II and Group VII compounds; and Group III-VI compound semiconductors composed of Group III and Group VI compounds.

Group IV elements include carbon, tin, silicon carbide, and silicon germanium, in addition to silicon and germanium mentioned above.

Group II-VI compound semiconductors include a compound of at least one element selected from Group II elements such as magnesium, calcium, strontium, barium, zinc, cadmium and mercury, and at least one element selected from Group VI elements such as oxygen, sulfur, selenium and tellurium. Concrete examples include magnesium oxide, calcium oxide, strontium oxide, barium oxide, zinc oxide, zinc sulfide, barium sulfide, cadmium sulfide, magnesium sulfide, calcium sulfide, strontium sulfide, zinc selenide, barium selenide, cadmium selenide, magnesium selenide, calcium selenide, strontium selenide, barium selenide, zinc telluride, cadmium telluride, strontium telluride, and barium telluride. The Group II-VI compound semiconductors may be compounds containing two or more of Group II element and/or Group VI element, such as calcium strontium selenide sulfide, in addition to compounds mentioned above having each element in a ratio of 1:1. In view of availability and stability of compounds, zinc sulfide, cadmium sulfide zinc selenide or cadmium selenide is preferable, and zinc sulfide is the most preferable.

Group III-V compound semiconductors include a compound of at least one element selected from Group III elements such as boron, aluminum, gallium, indium, and thallium and at least one element selected from Group V elements such as nitrogen, phosphorus, arsenic, antimony, and bismuth. Concrete examples include boron nitride, boron phosphide, boron arsenide, aluminum nitride, aluminum phosphide, aluminum arsenide, aluminum antimonide, gallium nitride, gallium phosphide, gallium arsenide, gallium antimonide, indium nitride, indium phosphide, indium arsenide, and indium antimonide. The Group III-V compound semiconductors may be compounds containing two or more of Group III element and/or Group V element, such as aluminum arsenide phosphide, in addition to compounds mentioned above having each element in a ratio of 1:1.

Group I-V compound semiconductors include a compound of at least one element selected from Group I elements such as sodium, potassium, cesium, lithium, and rubidium and at least one element selected from Group V elements such as nitrogen, phosphorus, arsenic, antimony, and bismuth. Concrete examples include sodium antimonide, potassium antimonide, cesium antimonide, trilithium antimonide, trilithium bismuthide, trisodium antimonide, tripotassium antimonide, trirubidium antimonide, tricesium antimonide, tricesium bismuthide, and trirubidium bismuthide. The Group I-V compound semiconductors may be compounds containing two or more of Group I element and/or Group V element, such as sodium potassium antimonide and cesium potassium antimonide, in addition to compounds mentioned above having each element in a ratio of 1:1.

Group I-VI compound semiconductors include a compound of at least one element selected from Group I such as copper and silver and at least one element selected from Group VI elements such as oxygen, sulfur, selenium, and tellurium. Concrete examples include copper oxide, dicopper oxide, dicopper sulfate, copper selenide, copper telluride, silver oxide, silver sulfide, silver selenide, and silver telluride. The Group I-VI compound semiconductors may be compounds containing two or more of Group I element and/or Group VI element, such as copper-silver oxide, in addition to compounds mentioned above having each element in a ratio of 1:1.

Group I-VII compound semiconductors includes a compound of at least one element selected from Group I elements such as copper and silver and at least one element selected from Group VII elements such as fluorine, chlorine, bromine, and iodine. Concrete examples include copper fluoride, copper chloride, copper bromide, copper iodide, silver fluoride, silver chloride, silver bromide, and silver iodide. The Group I-VII compound semiconductors may be compounds containing two or more of Group I element and/or Group VII element, in addition to compounds mentioned above having each element in a ratio of 1:1.

Group II-IV compound semiconductors include a compound of at least one element selected from Group II elements such as magnesium, calcium, strontium, and barium and at least one element selected from Group IV elements such as carbon, silicon, germanium, tin, and lead. Concrete examples include dimagnesium silicide, dimagnesium germanide, dimagnesium stannide, dimagnesium plumbide, dicalcium silicide, dicalcium stannide, and dicalcium plumbide. The Group II-IV compound semiconductors may be compounds containing two or more of Group II element and/or Group IV element, in addition to compounds mentioned above having each element in a ratio of 1:1.

Group II-V compound semiconductors include a compound of at least one element selected from Group II elements such as magnesium, zinc, cadmium, and mercury and at least one element selected from Group V elements such as arsenic, phosphorus, and antimony. Concrete examples include trimagnesium diarsenide, trizinc diphosphide, trizinc diarsenide, tricadmium diphosphide, tricadmium diarsenide, tetrazinc triantimonide, tetracadmium triantimonide, zinc antimonide, cadmium antimonide, zinc diphosphide, zinc diarsenide, cadmium diphosphide, cadmium diarsenide, and cadmium tetraphosphide. The Group II-V compound semiconductors may be compounds containing two or more of Group II element and/or Group V element, in addition to compounds mentioned above having each element in a ratio of 1:1.

Group II-VII compound semiconductors include a compound of at least one element selected from Group II elements such as cadmium and mercury and at least one element selected from Group VII elements such as chlorine, bromine, and iodine. Concrete examples include cadmium chloride, cadmium bromide, and cadmium iodide. The Group II-VII compound semiconductors may be compounds containing two or more of Group II element and/or Group VII element, in addition to compounds mentioned above having each element in a ratio of 1:1.

Group III-VI compound semiconductors include a compound of at least one element selected from Group III elements such as boron, aluminum, gallium, indium, and thallium and at least one element selected from Group VI elements such as oxygen, sulfur, selenium, and tellurium. Concrete examples include gallium sulfide, gallium selenide, gallium telluride, indium sulfide, indium selenide, indium telluride, thallium sulfide, thallium selenide, thallium telluride, digallium trisulfide, digallium triselenide, digallium tritelluride, diindium trisulfide, diindium triselenide, and diindium tritelluride. The Group III-VI compound semiconductors may be compounds containing two or more of Group III element and/or Group VI element, in addition to compounds mentioned above having each element in a ratio of 1:1.

Among these, use of a Group II-VI compound semiconductor is preferable in producing a visible light, since a band gap can be varied in a wide range. Use of a Groups III-V compound semiconductor is also preferable since the band gap is in the visible light range.

Iridium Source:

The inorganic composition of the present invention is characterized in that it contains iridium element, and iridium source is used to dope iridium element. The iridium source may be composed of solely iridium element, or may be in a form of oxide or sulfide, or further may be in a form of salts with other elements. Iridium compounds include iridium chloride, iridium sulfate, iridium nitrate, iridium nitrite, iridium oxide, ammonium hexachloroiridate(IV), hexachloroiridate(IV) n-hydrate, chlorocarbonyl bis(triphenylphosphine)iridium(I), and sodium iridium(III) chloride n-hydrate. These iridium compounds may be used in a single kind or in a combination of two or more kinds.

Metal Source Except for Iridium:

An inorganic composition containing a metal source except for iridium may be used as a raw material for producing a luminescent material by subjecting the inorganic composition to a doping treatment described below. The metal source includes metal elements such as transition metals including manganese, copper, silver, gold, and hafnium; and rare earth elements including cerium, praseodymium, neodymium, samarium, europium, gadolinium, terbium, dysprosium, holmium, erbium, thulium, ytterbium, lutetium, and yttrium; and metal compounds of these metals, such as their sulfide, halide, and oxide. These metal sources may be added to the inorganic composition as an activator mentioned below.

Activator:

The inorganic composition of the present invention is, in particular, characterized in that it contains iridium element, and it may be converted into a luminescent material. The luminescent material may form an inorganic EL device which results in improved emission efficiency. Further, the emission efficiency of the device may be preferably improved by adding an activator to be doped into the compound semiconductor.

The activators preferably include transition metals, halogen, or rare earth elements. Transition metals include manganese, copper, silver, gold, and hafnium. Halogen includes chlorine, and bromine. Rare earth elements include cerium, praseodymium, neodymium, samarium, europium, gadolinium, terbium, dysprosium, holmium, erbium, thulium, ytterbium, lutetium, and yttrium. These may be used in a single kind or in a combination of two or more kinds, and may be used in a form of sulfide, halide, oxide, or the like.

Composition:

The inorganic composition before being converted into the inorganic composite of the present invention is not limited in particular, and includes an exemplary composition comprising:

from 80 to 95 parts by weight, preferably from 85 to 93 parts by weight of a compound semiconductor;

from 0.001 to 3 parts by weight, preferably from 0.005 to 1 parts by weight of iridium source and/or other metal source; and from 3 to 9 parts by weight, preferably from 4 to 7 parts by weight of an activator.

(Inorganic Composite and Producing Method Thereof)

In a first embodiment of a doping treatment, an inorganic composition is subjected to explosion in a sealed vessel using gunpowder and/or explosive, to form an inorganic composite (explosion method).

The gunpowder and explosive used in the explosion are not limited especially, and include nitroglycerin, TNT, nitrocellulose, nitrated pentaerythritol, graphite powder, smokeless powder, and RDX.

The amount of gunpowder and/or explosive used in the explosion method varies depending on apparatus and kind of explosive used, and accordingly, it should not be determined collectively, but in general, it is 1 to 10000 parts by weight, and form the viewpoints of economy and safety, 2 to 9000 parts by weight per 100 parts by weight of the inorganic composition.

The effect from explosion to the inorganic composition varies depending on amount of gunpowder and/or explosive, apparatus and kind of explosive used, and accordingly, it can not be precisely determined, but in general, the inorganic composition is subjected to a temperature of 500 to 4000° C., and preferably 600 to 3000° C.

Further, the time period for which the inorganic composition is exposed to a high temperature can not be precisely determined. In general, it is $1/10$ second to $1/10000$ second. Energy transfer by light may be assumed, and the time period for exposure is generally $1/10$ second to $1/10000$ second.

In the explosion method of the present invention, the flying velocity of materials by the explosion (or explosion velocity) is also important. Depending on the extent of the explosion velocity, an amount of impurities such as carbon in the inorganic composite obtained by the explosion varies. Accordingly, the explosion velocity is preferably 100 m/sec to 2000 m/sec, and more preferably 300 m/sec to 1000 m/sec.

Further, an instantaneous pressure by a shock wave and a temperature raise therewith can be assumed. It can be at least assumed that materials are subjected to a shock wave of 0.1 GPa to 50 GPa. A heat generated simultaneously with this shock wave can also be assumed, but a contribution of this heat can not be precisely estimated, since only a total temperature raise of the above temperature raise and a temperature raise due to the heat can be observed.

Figure 2:
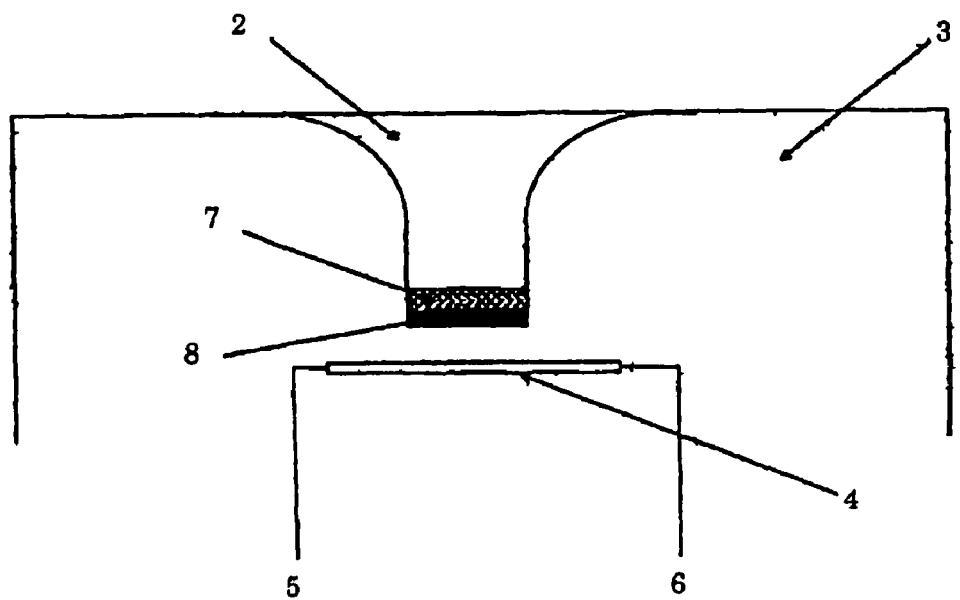
FIG. 2 is a magnification of a reaction chamber of a high pressure-resistant vessel.

The explosion method of the present invention may be performed using a pressure-resistant reaction vessel as shown in FIG. 1. In FIG. 1, 1 is a pressure-resistant reaction vessel, 2 is a reagent insert portion, 3 is a reaction vessel, 4 is a heater, and 5 and 6 are a power source supplying portion for a heating portion. A reaction is performed in the sealed pressure-resistant reaction vessel. FIG. 2 is a magnification of a reaction chamber of a high pressure-resistant vessel. In the figure, 7 is explosive or gunpowder, and 8 is an inorganic composition. The inorganic composite may be prepared using apparatus for producing synthetic diamond by explosion (For example, apparatus disclosed in patent documents 5 and 6).

[patent document 5] Japanese patent publication Kokai Sho63-243205

[patent document 6] Japanese patent publication Kokai 2002-153747

In particular, the inorganic composition preferably contains an iridium source as a metal source. Even if the inorganic composition contains an iridium source, the method of doping the iridium source into a compound semiconductor is not limited in particular. The doping operation may be performed during a formation of a compound semiconductor, in particular II-VI compound semiconductor, for example, during a reducing reaction in a liquid phase. The doping operation may also be performed by heating or firing a compound semiconductor, in particular II-VI compound semiconductor, and an iridium source at 700° C. or more under inert gas or under reducing gas such as hydrogen sulfide. A method of subjecting an inorganic composition comprising a compound semiconductor, in particular II-VI compound semiconductor, and an iridium source to explosion with gunpowder and/or explosive (explosion method) in a sealed vessel may also be adopted.

A doped amount of iridium source and/or other metal source into a compound semiconductor is not limited in particular, but in general, it is from $1 \times 10^{-5}$ parts by weight to 2 parts by weight, and from the viewpoint of emission efficiency and economy, from $5 \times 10^{-5}$ parts by weight to 0.5 parts by weight, per 100 parts by weight of a compound semiconductor.

A doped amount of an activator is not limited in particular, but in general, as the total metal weight, it is from $1 \times 10^{-3}$ parts by weight to 10 parts by weight, and preferably from $1.5 \times 10^{-3}$ parts by weight to 1 parts by weight, and from the viewpoint of emission efficiency, from $2 \times 10^{-3}$ parts by weight to 0.5 parts by weight, per 100 parts by weight of a compound semiconductor.

Further, the inorganic composition may directly and simultaneously be used for preparation of a thin film during a film formation of II-VI compound semiconductor such as zinc sulfide by a process such as electron beam or sputtering. In the case that a composition is made by subjecting a compound semiconductor, iridium source and/or other metal source, and an activator to a process such as electron beam or sputtering, the iridium source may be solely iridium element, and is preferably in a form of oxide, sulfide, or halide such as chloride or fluoride.

The fact that iridium element and/or other metal element is doped into a compound semiconductor can be confirmed by measuring quantum efficiency. The quantum efficiency stands for a ratio of (the number of photon emitted due to excitation by incident light)/(the number of photon of the incident light absorbed in a substance).

Larger values of the quantum efficiency means higher doping effects, and the value may be measured by fluorophotometer.

(Luminescent Material)

In the present invention, the inorganic composite obtained by the explosion method may be converted to a luminescent material through heat-treatment. The heat-treatment may be conducted in several times, and a treatment for adjusting a particle size, such as pulverization, may be conducted during the heat-treatment.

The temperature for the heat-treatment varies depending on kind of the inorganic composite used as the raw material, but in general, it is 500 to 1000° C., and preferably 600 to 800° C. The time period for the heat-treatment is not limited in particular, but in general, it is 1 to 20 hours, and preferably 2 to 10 hours.

Before the heat-treatment, to the inorganic composite, conductive compounds such as gallium oxide, zinc oxide, indium oxide, or tin oxide, or compound semiconductors such as gallium arsenide, indium arsenide, gallium phosphide, or indium phosphide may be added.

As will be explained in detail below, an inorganic EL device may be formed from the luminescent material of the present invention by vapor deposition and the like. The method for vapor deposition is not limited in particular, and includes commonly used methods such as EB (electron beam) method, sputtering method, or flash method.

(Dielectric)

Figure 3:
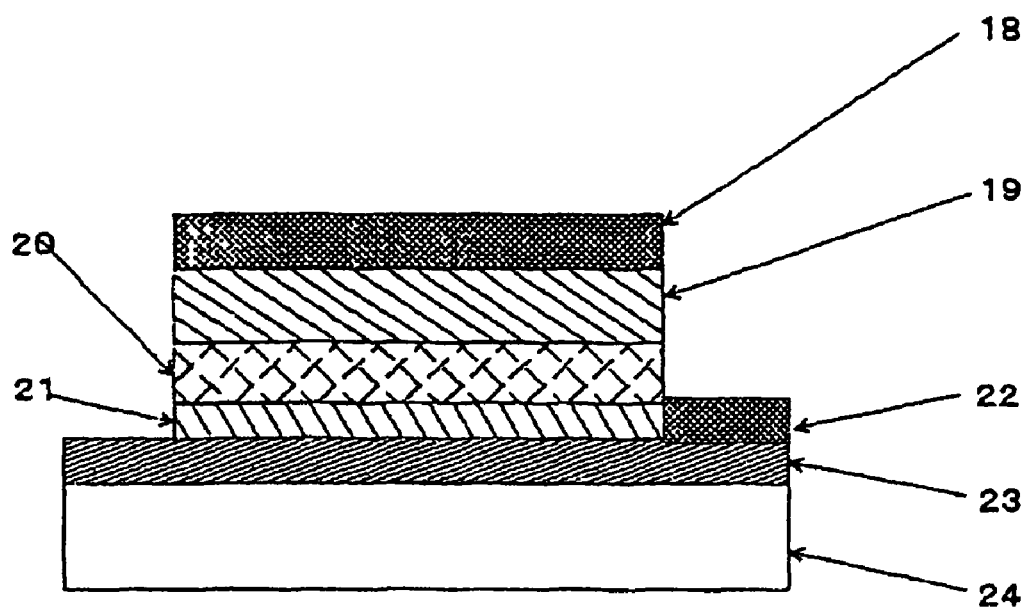
FIG. 3 is a sectional view of the EL device prepared by using a luminescent material obtained in Examples 1-1 to 1-3, and Comparative Example 1-1.

In the event that an alternating current driving device is prepared using a luminescent material of the present invention, a structure, in which a light emitter layer is sandwiched between dielectric layers as shown in FIG. 3, is adopted. The dielectric including known materials such as yttrium oxide, tantalum oxide, aluminum nitride, silicon nitride, or barium titanate, is used to form a thin film having a thickness of about 0.1 μm to about 1 μm by sputtering, vapor deposition, screen printing, or the like.

FIG. 3 is a sectional view of an example of an EL device using the luminescent material of the present invention. In the figure, 18 is a rear electrode, 19 and 21 are a dielectric, 20 is a light emitter, 22 is an electrode, 23 is a transparent electrode, and 24 is a glass substrate.

(Inorganic EL Device)

As described above, electroluminescence devices (EL devices) are roughly classified into inorganic EL devices and organic EL devices due to the difference of their light emitter materials. The inorganic EL device using an inorganic material for the light emitter has a characteristic that the emission lifetime is longer than that of the organic EL device using an organic material for the light emitter. Thereby the inorganic EL device has been put to practical use mainly for applications requiring high durability, such as cash register display units, in-vehicle monitors, and clock backlights.

Figure 4:
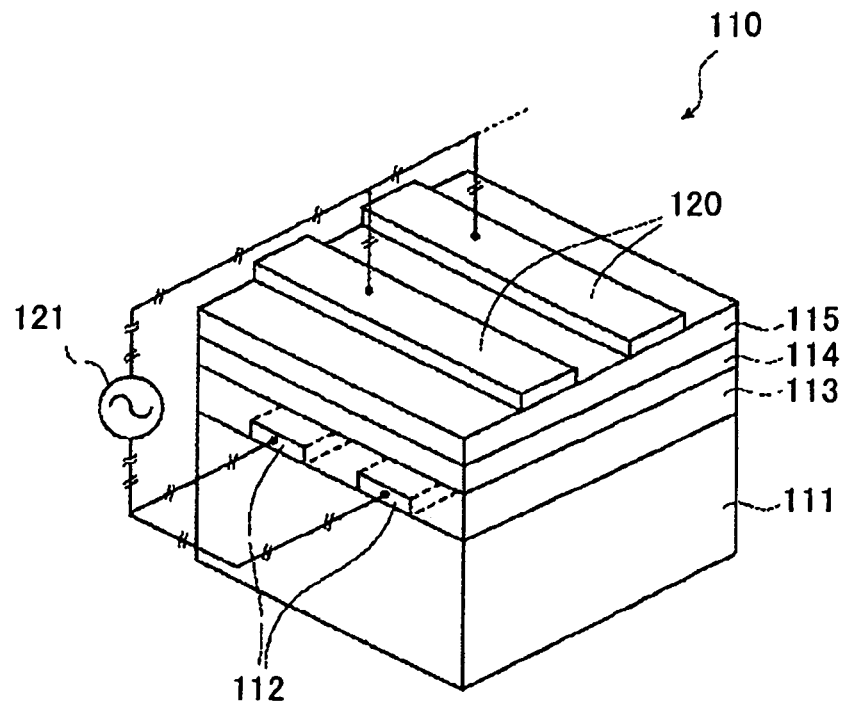
FIG. 4 is a perspective view showing a key portion of a representative configuration of a conventional inorganic EL device.

FIG. 4 is a perspective view showing a key portion of a representative configuration of a conventional inorganic EL device. An EL device 110 is a thin film EL device of double insulation type, which is formed by laminating lower electrode 112, lower insulator layer 113, light emitter layer 114, upper insulator layer 115 and upper electrode 120 in the described order on transparent substrate 111 having an electric insulation property (see FIG. 3 of patent document 7).

[patent document 7] Japanese patent publication Kokai 2004-265740

As the transparent substrate 111, there is employed a transparent substrate such as a blue plate glass commonly used in LCD (Liquid Crystal Display) and PDP (Plasma Display Panel). The lower electrode 112 is generally composed of ITO (Indium Tin Oxide) with a film thickness of about 0.1 to 1 μm. The upper electrode 120 is composed of a metal such as Al. The lower insulator layer 113 and the upper insulator layer 115 are thin films with a thickness of about 0.1 to 1 μm each formed by a method such as sputtering or vapor deposition, which are generally made of $Y_2O_3$, $Ta_2O_5$, AlN, $BaTiO_3$ and other materials. The light emitter layer 114 is generally composed of a light emitter containing a dopant which is to be an emission center, and its film thickness is generally about 0.05 to 1 μm.

In the conventional EL device having such a configuration, when the electrodes are applied with an alternative voltage or a pulse voltage from an AC power source 121, the light emitter layer 114 produces electroluminescence, and its output light is taken out from the transparent substrate 111 side. In the use of the inorganic EL device as a display, the lower electrodes 112 and the upper electrodes 120 are provided in a stripe-like pattern, wherein one side is set to the row electrodes and the other side is set to the column electrodes, and both of the electrodes are arranged so that the stretching directions thereof are orthogonal to each other. In other words, the matrix electrodes are formed by the electrodes 112 and the electrodes 120, in which the portions of the light emitter layer at the crossovers of the row and column electrodes represent pixels, thereby when the alternative voltage or pulse voltage is selectively applied thereto, a specific pixel is emitted, and its output light is taken out from the transparent substrate 111 side.

However, the above inorganic device requires to be applied with an alternative voltage of 100 V or more at a frequency in the range of several hundreds Hz to dozens KHz, being less and less used in mobile devices such as notebook computers and cellular phones that use batteries, due to the fact that the DC-AC conversion device is necessary and for other reasons.

On the other hand, attention has been recently focused on the organic EL element as an element capable of being driven by a direct current, which is commercialized for the in-vehicle applications and cellular phones that use batteries. However, a fluorescent organic solid which is a material of the light emitting layer of the organic EL device is weak against moisture, oxygen and other substances. Also, the characteristics of the electrode provided on the light emitting layer directly, or through a hole injection layer or electron injection layer, are likely to deteriorate due to oxidation. Thus, there is a problem that when the conventional organic EL device is driven in the atmosphere, the emission characteristic deteriorates rapidly. Various efforts are made to cope with this problem (For example, see patent document 8), but the problem is not perfectly solved from the point of view of the lifetime.

[patent document 8] Japanese patent publication Kokai Hei11-329718

Thus, the direct current inorganic EL device capable of being driven by direct current has been studied with taking advantage of the feature of the long lifetime of the inorganic EL (For example, see patent documents 9 and 10).

[patent document 9] Japanese patent publication Kokai Hei05-074572

[patent document 10] Japanese patent publication Kokai, 2002-313568

However, in the case of the conventional direct current inorganic EL devices including those described in the above patent documents 9 and 10, mostly there is no description about the brightness, and the approach to realize high brightness has not been sufficiently carried out.

Thus, there is a need for an inorganic EL device that can be driven by direct current and is useful for high-brightness applications such as lights and light sources in the use of mobile applications and the like.

The direct current inorganic EL device of the present invention is an inorganic EL device including at least plural electrode layers and a light emitter layer made of an inorganic composition and provided between the electrode layers, and is characterized in that the attained brightness in the DC drive is 10000 cd/m² or more. Herein, the term "brightness" refers to a value of which light with a measured viewing angle of 1 degree, when viewed from the normal direction of the light emitting surface of the inorganic EL device, is measured by a telescopic brightness meter. Further, in the inorganic EL device of the present invention, it is desired that the thickness of the EL light emitter layer is 0.05 μm or more and 50 μm or less. Optimizing the thickness of the light emitter layer enables low voltage drive and prevention of short circuit between the electrodes. Further, in the inorganic EL device of the present invention, it is desired that the surfaces between the above described two electrode layers are both made of different compositions. Changing and optimizing the compositions of the surfaces between the electrodes allows to increase the performances, such as to increase the emission efficiency and the lifetime due to the improvement of the adhesion strength with the electrodes.

The inorganic EL element of the embodiment includes at least a light emitter layer made of an inorganic composite between plural electrodes, wherein the attained brightness in the direct current drive is 10000 cd/m² or more. In applications where high brightness is necessary, the attained brightness in the DC drive is preferably 50000 cd/m² or more, and more preferably 100000 cd/m² or more, and more preferably 300000 cd/m² or more, and more preferably 500000 cd/m² or more.

In general, a light emitter layer is positioned between a first electrode and a second electrode. It is desired that the first and second electrodes cover a whole front and back main surface of the light emitter layer, whereby the whole light emitter layer is provided with high efficient conductivity and bright and even emission is attained.

With regard to the plural electrodes sandwiching the light emitter layer, in the case of realizing high brightness, a large amount of current flows, so that the surface resistivity is preferably low in order to suppress heat due to the resistance value of the electrode layer. The surface resistivity is preferably 5Ω/□ or less, and more preferably 1Ω/□ or less.

The plural electrodes sandwiching the light emitter layer may be the same or different from each other. In the case that the first electrode layer is the light output surface side of the inorganic light emitter layer, the first electrode layer should have a light transparency. It is desired that the first electrode layer has a sheet resistivity of not higher than 5Ω/□ and a transmission rate of a visible light of not lower than 90%. It is desired that it is formed of one, or two or more layers of transparent conducting materials such as ITO, IZO (Indium Zinc Oxide), GZO (Gallium Zinc Oxide), ZnO (Zinc Oxide), AZO (Antimony Zinc Oxide), or ATO (Antimony Tin Oxide), or that it is formed of a thin film of conducting materials such as silver, the thickness of which is so thin that a light can pass through. In general, conducting materials are deposited on a transparent substrate such as glass or sapphire by the sputtering method or the like to form the electrode layer.

In the case of performing the end face emitting operation that emits light from the end portions of the light emitter layer instead of outputting light via the first electrode layer covering the light emitter layer, or in the case of outputting light via an opening provided in the first electrode layer, the first electrode layer is not required to be transparent. In these cases, the electrode may be formed using materials having reflecting and conducting properties, such as silver, copper and aluminum, to output light with high efficiency via said end portions or said opening.

The method to form the electrode layer, which is not required to be transparent, is not limited in particular. For example, there is a method of forming the electrode by depositing a common metal such as silver or aluminum by the vapor deposition method or other methods, and when forming the electrode from the backside substrate, a method of making a conductive plane substrate such as a conductive silicon substrate as the electrode.

The light emitter layer must be formed of a luminescent material made from an inorganic composite capable of providing a light emission with high brightness. The production method of the material is not specifically limited, but includes a method that makes the inorganic composite have a specific structure by subjecting the inorganic composition to explosion, for example. Preferably, the characteristic of the material is that it emits light by PL (Photo Luminescence). If the thickness of the light emitter layer is too thick, the voltage between the electrodes rises in order to obtain an electric field strength required for light emission, so that from the point of view of making the voltage lower and of productivity, the thickness thereof is preferably 50 μm or less, and more preferably 20 μm or less, and more preferably 5 μm or less. If the thickness of the light emitter layer is too small, the electrodes layers on the both sides of the EL light emitter layer are likely to short-circuit, so that from the point of view of preventing this, the thickness thereof is preferably 0.05 μm or more, and more preferably 0.1 μm or more.

The deposition method used herein includes a vapor deposition method which is a physical vapor deposition method under vacuum, and methods of depositing an inorganic material, such as sputtering and ion plating. The material used for the inorganic EL light emitting layer for achieving high brightness is essentially stable but has a high melting point, so that it is preferable to use a deposition method, such as electron beam (EB) vapor deposition capable of evaporating a material having a high melting point and also capable of suppressing contamination from the crucible holding the material and the like, or sputtering when the inorganic material can be targeted.

Further, the method of changing the compositions in the two surfaces between the light emitter layer and the electrodes includes, for example, a method that sets the second component to another vapor deposition source or a target to change the film forming rate of the second component. It is also allowable to set the different two types of compositions to separate vapor deposition sources or targets to gradually change their film forming rates depending on the progress of deposition, or to change the film forming target from the first material to the second material during deposition. In the same manner as that described above, a layer of three or more types of compositions may be formed. It is desired to adopt the method of gradually changing the film forming rates or the method of forming a layer of three or more types of compositions, since these methods prevent from delamination. Further, in the same manner as that described above, the compositions of the both main surfaces of the light emitting layer are made to be the same to each other, and the composition between the main surfaces is made to be different from those of the main surfaces, so that a multi-layer structure can be formed. Since such layer structure enables to provide a composition suitable to increase adhesiveness with the electrodes to the main surface and to provide a composition suitable to increase light emission brightness between the main surfaces, the structure is advantageous, in particular, in the case that two electrodes sandwiching the light emitting layer are made of the same material.

With regard to improvement of an adhesiveness between the light emitter layer and the electrode layers, there is a method of mixing other metals to the luminescent material to improve affinity with the electrodes.

Further, for the purpose of improving brightness, a layer comprising a compound semiconductor such as gallium arsenide or indium phosphide may be provided between the light emitting layer and the electrode layers.

EXAMPLES

The present invention will be explained by the following examples. The present invention should not be limited by the examples.

Comparative Example 1-1

Preparation of Sample A 100 g of zinc sulfide, 0.5 g of zinc oxide, 0.5 g of copper(II) sulfate, 3 g of barium fluoride; 3 g of magnesium chloride, and 2 g of sodium chloride were weighted, and then placed in an alumina crucible. The crucible was settled in a vacuum firing furnace, the inside of which was being subjected to vacuum and then filled with nitrogen. The crucible was fired for 6 hours at 1000° C. After being cooled, the materials were washed with deionized water to remove unnecessary salts, and dried. The resulting fired cake was pulverized by a classifying pulverizer to form a powder having a particle size of 5 to 20 μm.

The powder was placed in an alumina crucible. The crucible was settled in a vacuum firing furnace, the inside of which was being subjected to vacuum and then filled with nitrogen. The crucible was fired for about 8 hours at about 700° C. under the nitrogen gas. The product was washed with glacial acetic acid to remove excessive compounds, unnecessary salts and impurities, and washed with deionized water. Then, the product was filtered, dried at about 180° C., and cooled to form a luminescent material (Sample A).

Example 1-1

Preparation of Sample B 100 g of zinc sulfide, 0.5 g of zinc oxide, 0.27 g of manganese(II) sulfate, 3 g of barium fluoride, 3 g of magnesium chloride, 2 g of sodium chloride, and 0.012 g of iridium(III) chloride were weighted, and then placed in an alumina crucible. The crucible was settled in a vacuum firing furnace, the inside of which was being subjected to vacuum and then filled with nitrogen. The crucible was fired for 6 hours at 1000° C.

After being cooled, the materials were washed with deionized water to remove flux, and dried. The resulting fired cake was pulverized by a classifying pulverizer to form a powder having a particle size of 5 to 20 μm.

The powder was placed in an alumina crucible. The crucible was settled in a vacuum firing furnace, the inside of which was being subjected to vacuum and then filled with nitrogen. The crucible was fired for about 8 hours at about 700° C. under the nitrogen gas. The product was washed with glacial acetic acid to remove excessive compounds, flux and impurities, and washed with deionized water. Then, the product was filtered, dried at about 180° C., and cooled to form a luminescent material (Sample B).

Example 1-2

Preparation of Sample C 100 g of zinc sulfide, 0.5 g of copper(II) sulfate, 0.5 g of zinc oxide, 3 g of barium fluoride, 3 g of magnesium chloride, and 2 g of sodium chloride were mixed and used as inorganic composition 8 shown in FIG. 2, and were placed in reaction chamber 2 shown in FIG. 2 of reaction vessel 1 shown in FIG. 1. Next, 32 g of TNT (the amount calculated for 500 atm.) was added as explosive 7, and the highly pressure-resistant reaction vessel 1 was sealed. After reducing the pressure to 0.01 mmHg, a current was passed through heater 4 to heat reaction chamber 2 to a temperature of 450° C. to induce explosion of the TNT to thereby form fired cake.

The fired cake was then removed from reaction vessel 1, cooled, washed with deionized water to remove flux, and dried. The resulting fired cake was pulverized in a classifying pulverizer to produce a powder having a particle size of from 5 to 20 μm. The resulting powder was placed in a silica tube reaction vessel of a cylindrical electric furnace, and fired in a nitrogen atmosphere at a temperature of about 700° C. for about 8 hours in the silica tube. The resulting product was washed with glacial acetic acid to remove excessive compounds, flux and impurities, and washed with deionized water. The product was then filtered, dried at about 180° C., cooled, and sieved in a classifier to produce a luminescent material (Sample C).

Example 1-3

Preparation of Sample D 100 g of zinc sulfide, 0.5 g of zinc oxide, 0.27 g of manganese(II) sulfate, 3 g of barium fluoride, 3 g of magnesium chloride, 0.012 g of iridium(III) chloride, and 2 g of sodium chloride were mixed and used as inorganic composition 8 shown in FIG. 2, and were placed in reaction chamber 2 shown in FIG. 2 of reaction vessel 1 shown in FIG. 1. Next, 32 g of TNT (the amount calculated for 500 atm.) was added as explosive 7, and the highly pressure-resistant reaction vessel 1 was sealed. After reducing the pressure to 0.01 mmHg, a current was passed through heater 4 to heat reaction chamber 2 to a temperature of 450° C. to induce explosion of the TNT to thereby form fired cake.

The fired cake was then removed from reaction vessel 1, cooled, washed with deionized water to remove flux, and dried. The resulting fired cake was pulverized in a classifying pulverizer to produce a powder having a particle size of from 5 to 20 μm. The resulting powder was placed in a silica tube reaction vessel of a cylindrical electric furnace, and fired in a nitrogen atmosphere at a temperature of about 700° C. for about 8 hours in the silica tube. The resulting product was washed with glacial acetic acid to remove excessive compounds, flux and impurities, and washed with deionized water. The product was then filtered, dried at about 180° C., cooled, and sieved in a classifier to produce a luminescent material (Sample D).

(Measurement of Brightness)

The luminescent materials obtained in Comparative Example 1-1, and Examples 1-1, 1-2 and 1-3 were classified to obtain a luminescent body particle containing 80% or more of a particle having 12 to 18 μm. A luminescent body paste was prepared by dispersing the luminescent body particle in a binder (7155 manufactured by DuPont) so that the concentration of the particle is 70% by weight. Then, on an electrode composed of glass substrate 24 with ITO film 23, barium titanate paste (7153 manufactured by DuPont), the above luminescent body paste, and barium titanate paste (7153 manufactured by DuPont) were applied in this order by a silk-screen to form barium titanate layer 21, light emitting layer 20, and barium titanate layer 19. Then, on barium titanate layer 19, a silver paste was applied to form electrode 18. Further, on the periphery of ITO film 23, a silver paste was applied to form auxiliary electrode 22. From the above procedure, an inorganic EL device as shown in FIG. 3 was obtained. Eight kHz alternating current voltage was applied between electrode 18 and auxiliary electrode 22. The voltage was 280 V. The brightness shown in Table 1 is the values measured after 0 hours, 24 hours, and 100 hours.

The luminescent materials obtained in Examples 1-1, 1-2 and 1-3 exhibit the brightness maintained at 65% or more of the initial brightness even after 100 hours, while the brightness decreases to less than a half of the initial brightness after 100 hours in the luminescent materials of Comparative Example 1-1.

TABLE 1

| | | brightness (cd/m$^2$) | | |
| --- | --- | --- | --- | --- |
| | Luminescent material | Initial | After 24 hours | After 100 hours |
| Comparative Example 1-1 | Sample A | 485 | 322 | 221 |
| Example 1-1 | Sample B | 612 | 499 | 403 |
| Example 1-2 | Sample C | 1021 | 877 | 851 |
| Example 1-3 | Sample D | 1202 | 1065 | 1026 |

Example 2-1

100 g of zinc sulfide, 0.5 g of zinc oxide, 0.27 g of manganese(II) sulfate, 3 g of barium fluoride, 3 g of magnesium chloride, 2 g of sodium chloride, and 0.012 g of iridium(III) chloride were weighted, and then placed in an alumina crucible. The crucible was settled in a vacuum firing furnace, the inside of which was being subjected to vacuum and then filled with nitrogen. The crucible was fired for 6 hours at 1000° C. After being cooled, the materials were washed with deionized water to remove unnecessary salts, and dried. The resulting fired cake was pulverized by a classifying pulverizer to form a powder having a particle size of 5 to 20 μm.

The resulting powder was placed in a silica tube reaction vessel of a cylindrical electric furnace, and fired in a nitrogen atmosphere at a temperature of about 700° C. for about 8 hours in the silica tube. The resulting product was washed with glacial acetic acid to remove excessive compounds, unnecessary salts and impurities, and washed with deionized water. The product was then filtered, dried at about 180° C., and cooled.

The quantum efficiency of the resulting light emitter was measured using Fluorophotometer FP-6500 manufactured by Nippon Bunkou Co. and equipped with a fluorescent integrating-sphere unit and a solid quantum efficiency calculating program, under a measuring conditions of 1 mm slit attachment, exciting wavelength: 350 nm, exciting band width: 5 nm, and fluorescent band width: 1 nm. The results are shown in Table 2.

Comparative Example 2-1

A fluorescent body powder was obtained in the same manner as that of Example 2-1, except that iridium chloride was not used. The quantum efficiency of the resulting fluorescent body is shown in Table 2.

Example 2-2

A fluorescent body powder was obtained in the same manner as that of Example 2-1, except that 0.27 g of copper(II) sulfate was used instead of manganese sulfate. The quantum efficiency of the resulting fluorescent body is shown in Table 2.

Comparative Example 2-2

A fluorescent body powder was obtained in the same manner as that of Example 2-2, except that iridium chloride was not used. The quantum efficiency of the resulting fluorescent body is shown in Table 2.

Example 2-3

A fluorescent body powder was obtained in the same manner as that of Example 2-1, except that 0.5 g of zinc selenide was used instead of zinc oxide. The quantum efficiency of the resulting fluorescent body is shown in Table 2.

Comparative Example 2-3

A fluorescent body powder was obtained in the same manner as that of Example 2-3, except that iridium chloride was not used. The quantum efficiency of the resulting fluorescent body is shown in Table 2.

Example 2-4

100 g of strontium sulfide, 0.3 g of cerium fluoride, 0.012 g of iridium(III) chloride, 0.3 g of potassium chloride and 5 g of sulfur were mixed, and the mixture was heated, in 100% $H_2S$, at 500° C. for 6 hours and then 200° C. for 7 hours to form a fluorescent body powder. The quantum efficiency of the resulting fluorescent body is shown in Table 2.

Comparative Example 2-4

A fluorescent body powder was obtained in the same manner as that of Example 2-4, except that iridium chloride was not used. The quantum efficiency of the resulting fluorescent body is shown in Table 2.

TABLE 2

|  | luminescent wavelength (nm) | quantum efficiency (%) |
| --- | --- | --- |
| Example 2-1 | 567 | 56 |
| Comparative Example 2-1 | 569 | 32 |
| Example 2-2 | 463 | 62 |
| Comparative Example 2-2 | 467 | 31 |
| Example 2-3 | 571 | 59 |
| Comparative Example 2-3 | 570 | 37 |
| Example 2-4 | 477 | 43 |
| Comparative Example 2-4 | 471 | 22 |

(Preparation of Luminescent Material Used in Examples 3-1 and 3-2)

An amount of 100 g of zinc sulfide was blended with 0.27 g of manganese(II) sulfate, 0.5 g of zinc oxide, 3 g of barium fluoride, 3 g of magnesium chloride, 0.012 g of iridium(III) chloride, and 2 g of sodium chloride, and the blended materials were put in a reaction chamber of a high pressure-resistant vessel, followed by adding 32 g of trinitrotoluene. The reaction vessel was sealed to reduce the pressure therein to 0.01 mmHg, and the reaction chamber was heated to about 450° C. to induce an explosion. After confirmation that the explosion reaction has been generated within the vessel, the reaction chamber was cooled and the crude product was collected. This was put into water and stirred, and then suspended solids are removed. The water content was removed, and then the product was dried at room temperature to obtain 15 g of a fired product. The fired product was milled by a milling machine, followed by adding thereto 5 mg of gallium arsenide and mixing. The mixture was heated at a temperature of 700° C. under nitrogen atmosphere for 8 hours to obtain a crude luminescent body. The crude luminescent body was added with a glacial acetic acid, stirred, and then dissolved materials were removed. Next, deionized water was added, and the mixture was stirred to wash the product, and then the water was removed. The resulting product was milled and powdered to make it serve as a luminescent material.

Using the luminescent material obtained by the above procedure, an EL device circuit shown in FIG. 5 and composed of first electrode layer (substrate) 101, first light emitter layer 102, second light emitter layer 103, second electrode layer (silver thin film) 104 and DC power source 109 was fabricated in line with the procedures explained below.

Example 3-1

Production of EL Device

On a transparent substrate 101 of Corning Glass (#1737), an ITO film having a thickness of 200 nm was formed by the sputtering method to provide a first electrode layer 101.

Next, the luminescent material provided from a first vapor deposition source and selenium provided from a second vapor deposition source were deposited by an EB vapor deposition unit through a 2×2 mm metal mask on the above glass substrate with the ITO film. The luminescent material was provided at a constant deposition rate from the first vapor deposition source, and selenium was provided from the second vapor deposition source at a deposition rate, and the two materials are deposited on the above glass substrate with the ITO film at the same time so that the weight ratio of selenium was 0.5% or less in the first half of the deposition process and the weight ratio of selenium was about 1% in the latter half of the deposition process. The degree of vacuum during the deposition process was $1\times10^{-4}$ Pa or less. The temperature of the glass substrate during the deposition process was about 300° C. This process resulted in a light emitter layer having a two-layer structure of a first layer 102 having a lower composition ratio of selenium, and a second layer 103 having a higher composition ratio of selenium. The thickness of the first layer was about 1 μm; the thickness of the second layer was about 1 μm; the total thickness of the two-layer structure was about 2 μm.

The substrate, on which the light emitting layer was formed, was taken out into the air, and then, to improve crystallinity, heat-treated at 650° C. for 60 minutes under nitrogen atmosphere. After the heat-treatment, onto the light emitting layer, using a resistance heating vapor deposition apparatus, a silver film having a thickness of about 200 nm was formed as a second electrode layer 104. During the formation of the silver film, the degree of vacuum was $7\times10^{-4}$ Pa, and the substrate was not heated. This process resulted in an EL device shown in FIG. 5 having a light emitting side of the first electrode layer 101.

Example 3-2

Production of EL Device

On a silicon single crystal substrate as a first electrode layer 101, the luminescent material was deposited by an EB vapor deposition unit through a 2×2 mm metal mask where a luminescent part was to be formed. In the formation of the light emitter layer, the above luminescent material was provided from a first vapor deposition source and selenium was provided from a second vapor deposition source, and the two materials were deposited on the silicon single crystal substrate through the 2×2 mm metal mask at the same time so that the weight ratio of selenium was 0.5% or less in the first half of the deposition process and the weight ratio of selenium was about 1% in the latter half of the deposition process. The degree of vacuum during the deposition process was $1\times10^{-4}$ Pa or less. The temperature of the glass substrate during the deposition process was about 300° C. This process resulted in a light emitter layer having a two-layer structure of a first layer 102 having a lower composition ratio of selenium, and a second layer 103 having a higher composition ratio of selenium. The thickness of the first layer was about 1 μm; the thickness of the second layer was about 1 μm; the total thickness of the two-layer structure was about 2 μm.

Next, using another vapor deposition source within the same chamber, silver was laminated at a thickness of less than 0.1 μm to make it serve as the second electrode layer 104.

Figure 5:
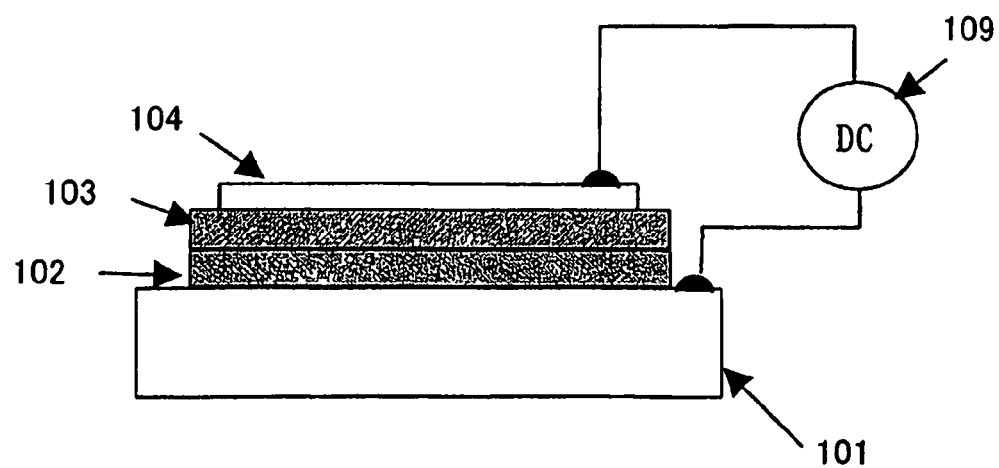
FIG. 5 is a schematic and sectional view of a key portion of the direct current inorganic EL device prepared in Examples 3-1 to 3-2 and Reference Example.

The above process resulted in an EL device as shown in FIG. 5 having a light emitting side of the second electrode layer 104.

(Evaluation of EL Device Produced in Examples 3-1 and 3-2)

The first electrode layer of the produced EL device of Example 3-1 and 3-2 was connected with a negative electrode of a DC power source and the second electrode layer was connected with a positive electrode of the DC power source. The brightness attained was evaluated. When the voltage was gradually increased, the brightness of 375,000 cd/m$^2$ was attained at 5 V.

Reference Example

The luminescent materials were produced in the same manner as that in Examples 3-1 and 3-2 except that as the doping method in the process for the luminescent materials used in Examples 3-1 and 3-2, a process of heating the inorganic compositions at 1200° C. for 5 hours was adopted instead of the explosion method. Using the resulting luminescent materials, the EL devices were produced in the same manner as that in Examples 3-1 and 3-2. The attained brightness of the resulting EL devices was only 6000 cd/m$^2$.

INDUSTRIAL AVAILABILITY

The present invention provides a method of producing an inorganic composite. The luminescent material obtained by heat-treating the inorganic composite produced by the method of the present invention has improved luminance as well as improved lifetime, and accordingly it can be preferably used for an inorganic device, and is industrially useful.

The inorganic composition of the present invention results in a luminescent material for forming an excellent light emitter without adopting a powdering step causing a new problem such as agglomeration, and accordingly it is industrially useful. The inorganic EL device prepared by using the inorganic composition of the present invention as a raw material for producing a luminescent material provides an efficient light emission by its composition of materials.

The invention claimed is:

1. An inorganic composition comprising a powder mixture of:
    a compound semiconductor as a main component;
    an iridium source; and
    at least one source of an element other than iridium, wherein the element is at least one element selected from the group consisting of a halogen element, a rare earth element, manganese, copper, silver and gold.

2. The inorganic composition of claim 1, wherein the compound semiconductor is a group II-VI compound semiconductor.

3. An inorganic composite for producing an luminescent material, which is obtained from the inorganic composition of claim 1 or 2.

4. A method of producing an inorganic composite, wherein the method comprises heat-treating the inorganic composition of claim 1 or 2 at 700° C. or higher in an inert atmosphere or a reducing atmosphere.

* * * * *